(12) United States Patent
Yamaguchi

(10) Patent No.: US 8,495,928 B2
(45) Date of Patent: Jul. 30, 2013

(54) VEHICLE TRANSMISSION

(75) Inventor: Kenichi Yamaguchi, Chiryu (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 713 days.

(21) Appl. No.: 12/444,251

(22) PCT Filed: Dec. 14, 2007

(86) PCT No.: PCT/IB2007/003910
§ 371 (c)(1),
(2), (4) Date: Apr. 3, 2009

(87) PCT Pub. No.: WO2008/075168
PCT Pub. Date: Jun. 26, 2008

(65) Prior Publication Data
US 2010/0024591 A1 Feb. 4, 2010

(30) Foreign Application Priority Data
Dec. 15, 2006 (JP) ................. 2006-338195

(51) Int. Cl.
F16H 57/02 (2012.01)

(52) U.S. Cl.
USPC ....................................... 74/606 R

(58) Field of Classification Search
USPC ............... 74/606 R, 6.12; 184/59, 6.12, 13.1
See application file for complete search history.

(56) References Cited

U.S. PATENT DOCUMENTS

| 2,937,449 | A | * | 5/1960 | Bade ................................ 33/727 |
| 3,422,982 | A | * | 1/1969 | Myers et al. .................... 220/374 |
| 5,724,864 | A | * | 3/1998 | Rodgers et al. .............. 74/606 R |
| 6,843,746 | B2 | | 1/2005 | Hayes et al. |
| 2004/0173051 | A1 | | 9/2004 | Sinka et al. |
| 2006/0054410 | A1 | * | 3/2006 | Nakamura et al. ........... 184/6.12 |

FOREIGN PATENT DOCUMENTS

| CN | 1690478 A | 11/2005 |
| JP | 52-121539 U | 8/1976 |
| JP | 59-13163 A | 1/1984 |
| JP | 62-162451 U | 10/1987 |
| JP | 03-125941 U | 12/1991 |
| JP | 8-219259 A | 8/1996 |
| JP | 10-205609 A | 8/1998 |
| JP | 2004-239292 A | 8/2004 |
| JP | 2005-291263 A | 10/2005 |

OTHER PUBLICATIONS

Chinese Office Action issued in corresponding Chinese Application No. 2007-80038285.6 dated Mar. 31,2011.

* cited by examiner

Primary Examiner — Vicky Johnson
(74) Attorney, Agent, or Firm — Sughrue Mion, PLLC

(57) ABSTRACT

A vehicle transmission (1) is provided that includes a casing (10); a gear (8), transversely mounted in the casing, that splashes up oil in the casing by rotation thereof and supplies the oil to a portion in the casing; and an air release passage (30) provided in the casing on an upstream side of oil flow generated by the rotation of the gear, that communicates with outside of the casing.

3 Claims, 6 Drawing Sheets

VEHICLE TRANSMISSION

BACKGROUND OF THE INVENTION

1. Field of the Invention

This invention relates to a transmission mounted on a vehicle, such as an automobile. The vehicle transmission generally includes an automatic transmission, a manual transmission or the like, such as a transaxle mounted on a front engine front wheel drive (FF) vehicle or a transmission mounted on a front engine rear wheel drive (FR) vehicle.

2. Description of the Related Art

When a vehicle transmission is operating, an oil pump sucks oil existing in an inner bottom portion of a casing and supplies the sucked oil to appropriate portions of the transmission.

In some cases, when a vehicle transmission is operating, oil is splashed up from an inner bottom portion of a casing by an appropriate rotating gear disposed inside the casing, and is guided to the suction side of an oil pump, a portion that particularly requires lubrication, or the like.

In this case, because the oil in the casing is delivered or conveyed to the downstream side by the rotation of the gear, the oil is not likely to be equally distributed in the internal space of the casing. In particular, as the gear rotates more rapidly, oil is delivered or conveyed more rapidly to the downstream side by the rotation of the gear, thereby enhancing the inequality in the oil distribution and increasing the temperature of the oil and the inner pressure of the casing.

Usually, to reduce the above-described increase in the inner pressure of the casing, an air release hole that releases air to outside is provided on the upper side of the casing.

To restrict or prevent the oil from being discharged from the air release hole, a breather plug is attached to the air release hole, or a breather chamber having a maze-like structure is provided to separate oil from air. (See, for example, Japanese Patent Application Publication Nos. 2005-291263 and 10-205609)

In the meantime, in the case where a casing of a vehicle transmission has a partitioned structure formed by combining multiple parts, the internal space of the casing may be divided into multiple sections, though the sections are mutually communicated.

In this case, when the vehicle transmission is operating, along with the oil delivering operation by the gear, a phenomenon may occur in which oil is likely to accumulate in a space positioned on the downstream side of the rotation direction of the gear (i.e., on the downstream side of the oil flow generated by the rotation of the gear), and air is likely to accumulate in a space positioned on the upstream side of the rotation direction of the gear (i.e., on the upstream side of the oil flow generated by the rotation of the gear).

In consideration of the phenomenon, the air release hole is typically provided in the ceiling wall of the casing on the side of the space where the oil is likely to accumulate.

In the above-described technologies, when the gear rotates at a high speed, the oil delivery by means of the gear becomes faster. Accordingly, in the space in which the oil is likely to accumulate (i.e., the space on the downstream side of the rotation direction of the gear), the oil is raised or increased and forms bubbles. On the other hand, in the space in which air is likely to accumulate (i.e., the space on the upstream side of the rotation direction of the gear), the inner pressure is likely to increase.

In this case, because the air release hole is provided above the space in which oil is likely to accumulate, it is difficult to release the inner pressure of the space in which air is likely to accumulate through the air release hole.

Due to the above, the inner pressure of the space in which air is likely to accumulate further increases, and the oil or its bubbles in the space in which oil is likely to accumulate is/are urged to be further raised. Therefore, in an extreme case, oil may leak to outside from the breather plug, or oil may passes through the breather chamber and leaks to outside from the air release hole.

SUMMARY OF THE INVENTION

The present invention provides a vehicle transmission in which oil in a casing is splashed up by rotation of a gear transversely mounted in the casing, and is supplied to an appropriate portion in the casing. The vehicle transmission particularly improves the inner pressure regulation of the casing at the time of high-speed rotation, and prevents oil from leaking from the casing.

According to an aspect of the present invention, a vehicle transmission is provided that includes a casing; a gear, transversely mounted in the casing, that splashes up oil in the casing by rotation thereof and supplies the oil to a portion in the casing; and an air release passage, provided in the casing on an upstream side of oil flow generated by the rotation of the gear, that communicates with outside of the casing.

Here, "a gear is transversely mounted" means that a gear is disposed such that the rotation center axis of the gear extends generally horizontally.

In the above-described construction, for example, when the gear rotates at a high speed, the oil in the casing is delivered or conveyed more rapidly by the gear to the downstream side of the oil flow generated by the rotation of the gear. Therefore, the oil may form bubbles, and the inner pressure of the casing on the upstream side of the oil flow is likely to increase.

However, according to the aspect of the present invention, the space in the casing on the upstream side of the oil flow generated by the rotation of the gear, in which the inner pressure is locally increased, is communicated with the outside of the casing though the air release passage. Therefore, when the inner pressure is increased on the upstream side of the oil flow generated by the rotation of the gear, the increased inner pressure is released to the open air swiftly and securely.

In addition, in the region where the air release passage is disposed, because air is likely to accumulate and oil is reduced or removed, the oil does not form bubble. Accordingly, the oil bubbles do not close or block an inner end (open end in the casing) of the air release passage.

As described above, because the liner pressure of the casing is released to the outside securely through the air release passage, it is prevented that the increase in the inner pressure causes leakage of the oil in the casing to outside through a breather hole or a breather plug.

An interior of the casing may be divided into a first section and a second section that are respectively located on the downstream side and the upstream side of the oil flow, and that mutually communicate.

In this construction, because the gear splashes up the oil, the oil is likely to accumulate in one of the two sections, and air is likely to accumulate in the other of the two sections.

An air release portion may further be provided in a ceiling wall of the casing at a position corresponding to the downstream side of the oil flow.

As described above, in this construction, the inner pressure on the upstream side of the oil flow generated by the rotation of the gear is regulated appropriately. In addition to that, according to this construction, at the time of high speed rotation, the rise of the oil or its bubbles is/are reduced in the space on the downstream side of the oil flow, in which the oil is likely to accumulate. Further, the air existing on the upper side of the space on the downstream side of oil flow generated by the rotation of the gear is released to the outside through the air release portion. Accordingly, the oil or its bubbles is/are prevented from leaking to the outside through a breather hole or a breather plug.

The air release passage may be a breather pipe. An end of the breather pipe is located in the casing on the upstream side of the oil flow, and the other end of the breather pipe is located outside of the casing.

According to this construction, because the breather pipe is used as the air release passage, the construction and the mounting operation are simplified, and the machine cost can be relatively low.

The breather pipe may extend generally vertically and penetrate a ceiling wall of the casing.

According to this construction, the pressure can be physically easily released. In addition, oil does not easily leak to the outside even when the gear is rotating at a low speed.

The gear may include a ring gear of a differential accommodated in the casing.

In this construction, the vehicle transmission is the one used in the front engine front wheel drive (FF) vehicle, and the gear to splash up oil is specified accordingly.

Thus, the operation of the vehicle transmission is stabilized and the durability of the vehicle transmission improves over the long term.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention is described with reference to the drawings below. FIGS. 1 to 6 show an embodiment of the present invention.

In this embodiment, a transaxle of a front engine front wheel drive (FF) vehicle is described as an example of a vehicle transmission.

Figure 1:
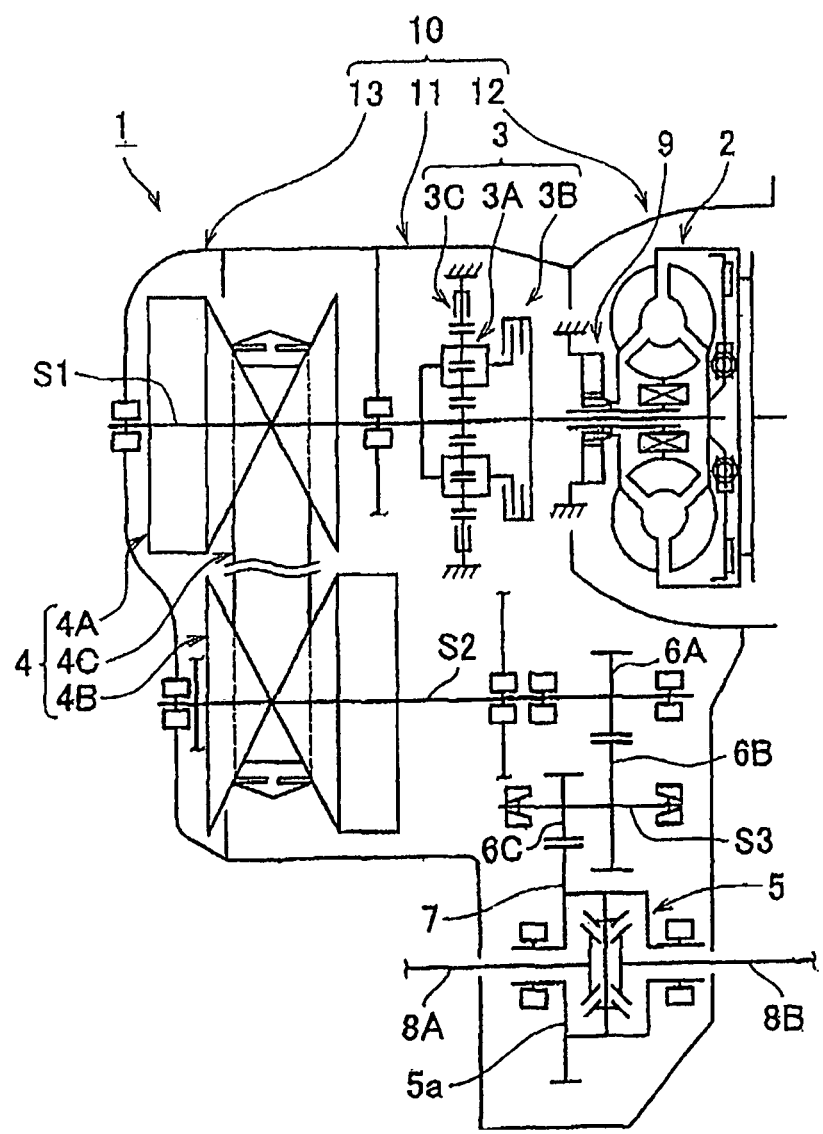
FIG. 1 is a skeleton diagram illustrating a construction of a transaxle in a developed state as a vehicle transmission according to an embodiment of the present invention.

FIG. 1 is a skeleton diagram illustrating a construction of a transaxle in a developed state as a vehicle transmission according to an embodiment of the present invention.

The transaxle 1 illustrated in FIG. 1 principally includes a torque converter 2, a forward-reverse switching device 3, a shifting mechanism 4, and a differential 5, accommodated in a single casing 10.

The transaxle 1 transmits, for example, rotation power (torque) input from an engine (not shown) via the torque converter 2 to driven wheels (not shown) via the forward-reverse switching device 3, the shifting mechanism 4 and the differential 5.

These components that form the transaxle 1 are basically publicly known components. Accordingly, those components will be only briefly described.

The forward-reverse switching device 3 switches between a vehicle forward travel state and a vehicle reverse travel state, as necessary. The rotation power (torque) input from the unshown engine via the torque converter 2 is output with the rotation direction unchanged in the vehicle forward travel state, and is output with the rotation direction reversed in the vehicle reverse travel state. The forward-reverse switching device 3 may include, for example, a double pinion planetary gear set 3A, a forward clutch 3B and a reverse brake 3C.

The shifting mechanism 4 is a belt-type continuously variable transmission (CVT) in this embodiment. In the shifting mechanism 4, a belt 4C is wound around a primary pulley 4A and a secondary pulley 4B. The shifting mechanism 4 changes speed by increasing and decreasing the wound diameter (effective diameter) of the belt 4C on the primary and secondary pulleys 4A, 4B.

The rotation power of the secondary pulley 4B of the shifting mechanism 4 is transmitted to the differential 5 via a reduction drive gear 6A, a reduction driven gear 6B, a differential drive pinion 6C and a final ring gear 7.

The differential 5 is for example a two-pinion type differential, and distributes or splits power input from the final ring gear 7 to transmit to left and right driven wheels (not shown) via left and right drive shafts 8A, 8B, as necessary.

The casing 10 accommodates the components of the transaxle 1 as described above, and is divided into four components in this embodiment.

Figure 2:
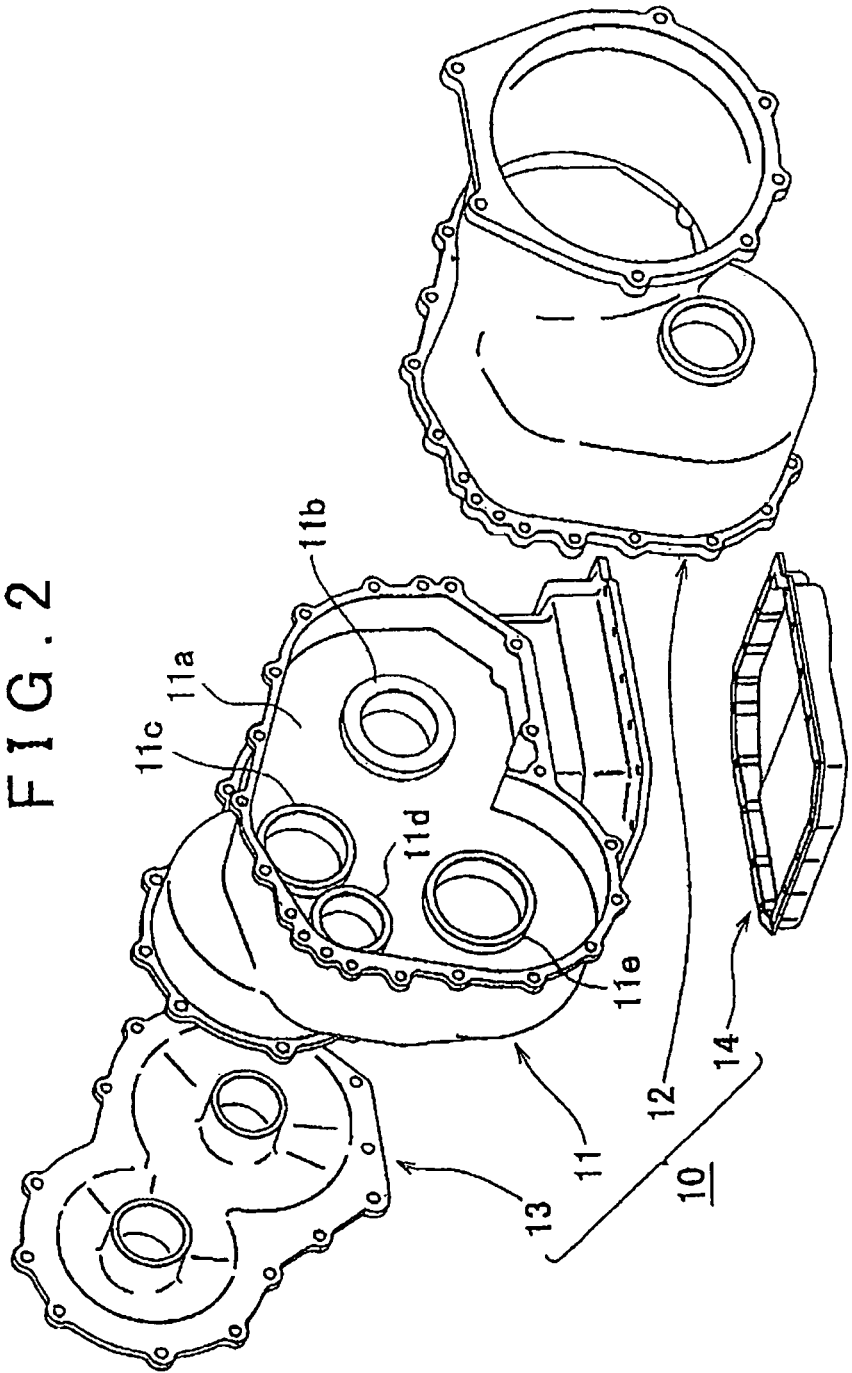
FIG. 2 is an exploded perspective view illustrating a casing of the transaxle shown in FIG. 1.

More specifically, the casing 10 includes, as shown in FIG. 2, for example, a transaxle case 11 disposed at the center, a transaxle housing 12 attached to one side of the transaxle case 11, a rear cover 13 attached to the other side of the transaxle case 11, and an oil pan 15 attached to the bottom side of the transaxle case 11.

A center partition wall 11a of the transaxle case 11 has four cylindrical boss portions 11b-11e. Shafts S1, S2, S3 and a case 5a of the differential 5 are respectively inserted into the boss portions 11b, 11c, 11d and 11e and rotatably supported by the boss portions 11b, 11c, 11d and 11e via roller bearings. The primary pulley 4A of the shifting mechanism 4 is provided on the shaft S1. The secondary pulley 4B and the reduction drive gear 6A are provided on the shaft S2. The differential drive pinion 6C and the reduction driven gear 6B are provided on the shaft S3.

A predetermined amount of oil is retained in the casing 10. The oil retained in the oil pan 14 is used, for example, as a lubricant that lubricates a rotation support portion or sliding portion of the components of the transaxle 1, or as hydraulic oil of the torque converter 2. The oil retained in the oil pan 14 is also used as hydraulic oil or the like of a hydraulic actuator (not shown) that engages and disengages the forward clutch 3B and the reverse brake 3C and the like of the shifting mechanism 4.

Incidentally, the oil in the casing 10 is supplied, for example, by the oil pump to any portion that needs the oil.

Hereinafter, the construction of the transaxle 1 according to the embodiment will be further described in detail with reference to FIGS. 3 to 6.

Figure 3:
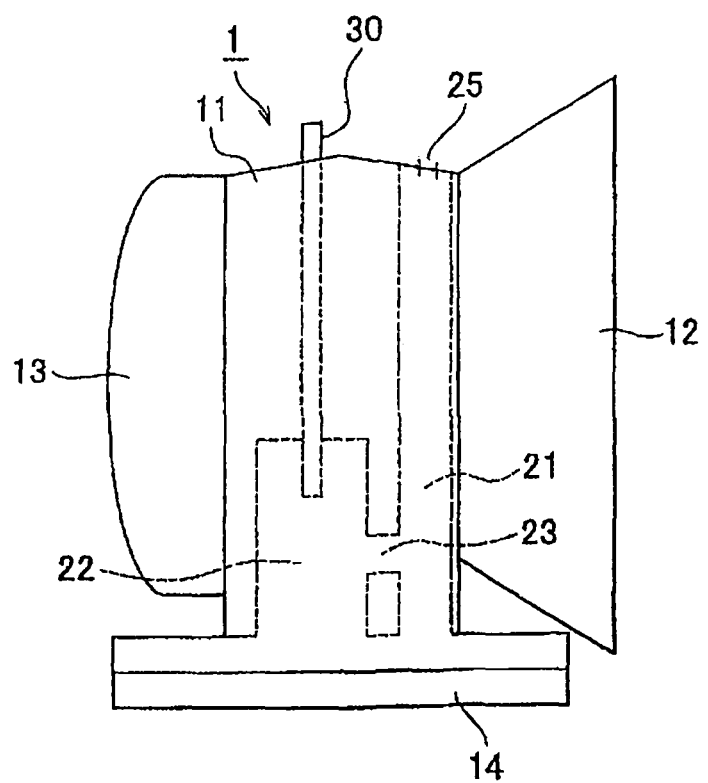
FIG. 3 is a schematic view of the transaxle shown in FIG. 1, viewed from a front end surface.
Figure 4:
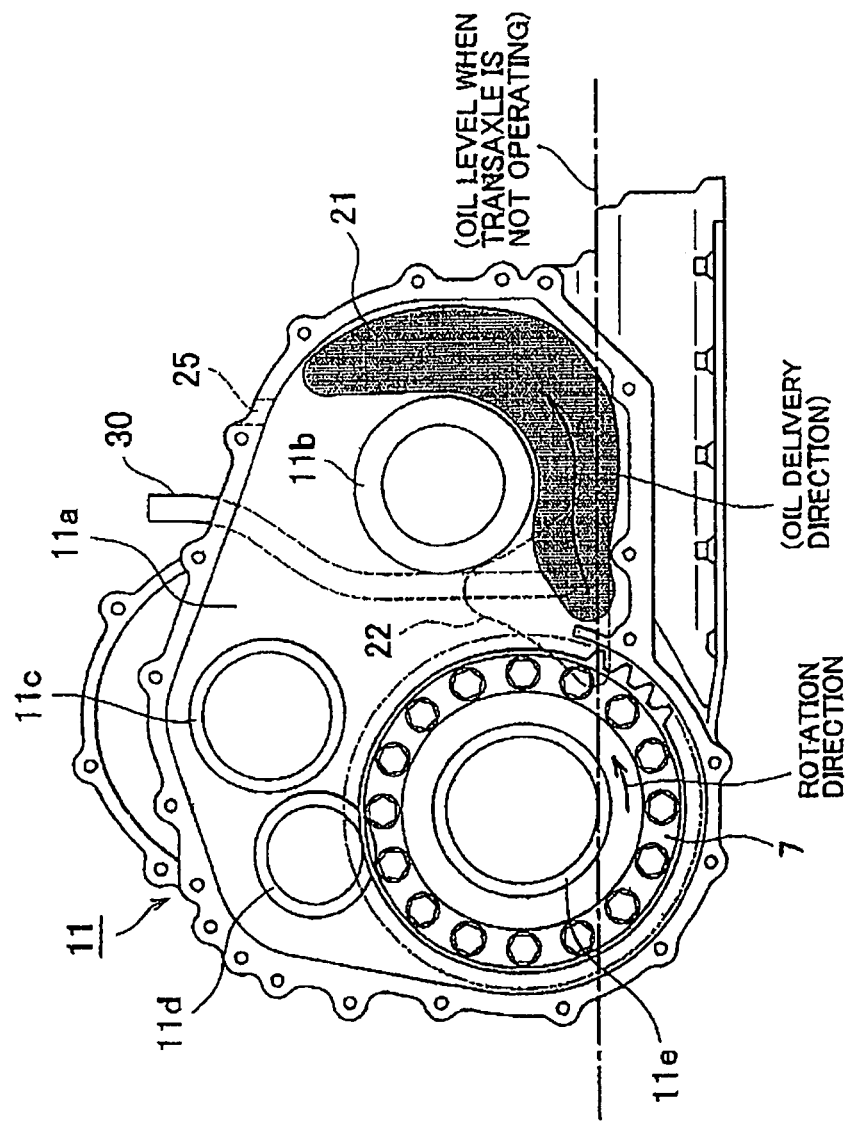
FIG. 4 is a schematic view illustrating a state of unequally distributed oil in a transaxle case in a condition that the transaxle housing shown in FIG. 3 is removed.
Figure 5:
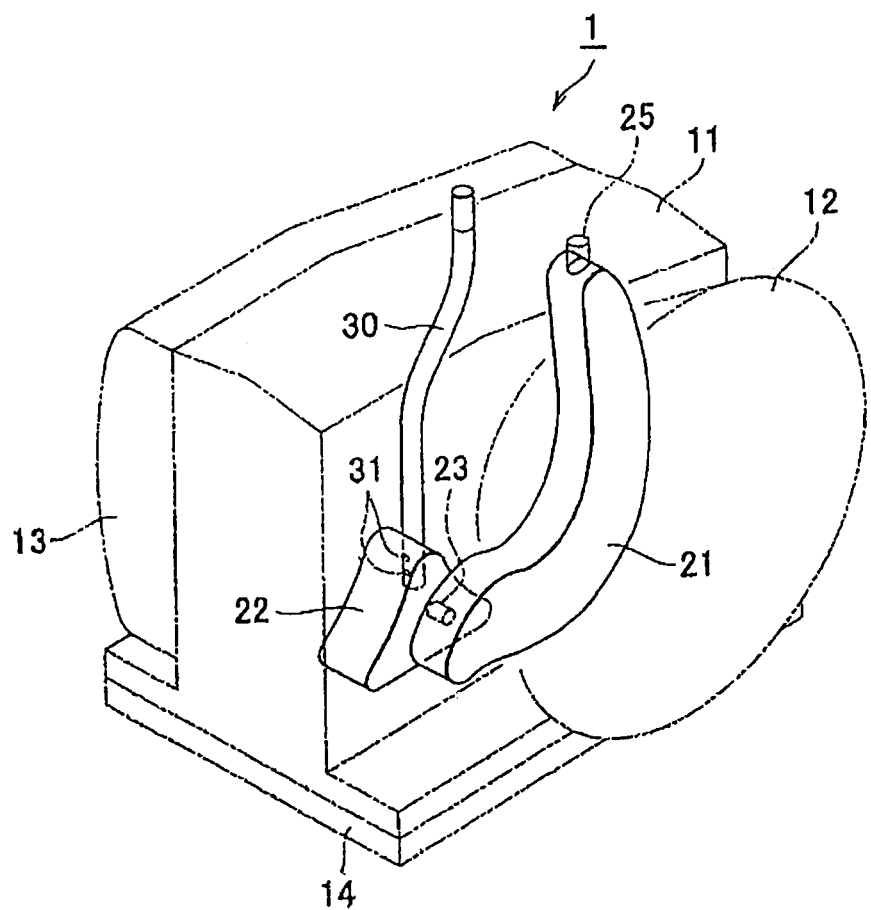
FIG. 5 is a perspective view schematically illustrating an internal space of the casing shown in FIGS. 3 and 4.
Figure 6:
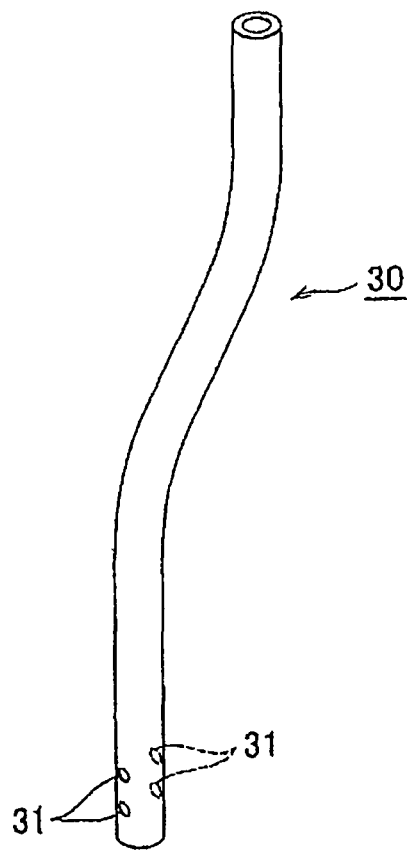
FIG. 6 is a perspective view of a breather pipe, as an air release passage, shown in FIGS. 3 to 5.

FIG. 3 is a schematic view illustrating the transaxle shown in FIG. 1, viewed from the front end surface. FIG. 4 is a schematic view illustrating a state of unequally distributed oil in a transaxle case in a condition that the transaxle housing shown in FIG. 3 is removed. FIG. 5 is a perspective view schematically illustrating an internal space of the casing shown in FIGS. 3 and 4. FIG. 6 is a perspective view of a breather pipe, as an air release passage, shown in FIGS. 3 to 5.

In this embodiment, the casing 10 includes two separated internal sections 21, 22. The two separated sections 21, 22 are mutually communicated via a communication passage 23. In other words, the interior of the casing 10 is divided into a first section 21 and a second section 22.

The first section 21 is provided between the transaxle case 11 and the transaxle housing 12 of the casing 10, which face each other. The second section 22 is provided between the transaxle case 11 and the rear cover 13, which face each other. The communication passage 23 is a transverse hole provided at a predetermined position in the center partition wall 11a.

Incidentally, both the first section 21 and the second section 22 are communicated with the oil pan 14. The final ring gear 7 is provided on the side of the first section 21.

When the transaxle 1 is not operating, the oil in the casing 10 is equal to or more than a specific level shown by the one dot chain line in FIG. 4, for example. In other words, the amount of oil retained in the casing 10 is equal to or more than a defined amount. In this state, the lower portion of the final ring gear 7 is soaked in the oil.

Then, as described above, the oil in the casing 10 is supplied, for example, by the oil pump 9, to any portion that needs the oil. In this case, for example, the oil that reaches a position of a predetermined height in the transaxle case 11 is, as shown by the solid line in FIG. 4, splashed up by the rotation (in the counterclockwise direction in FIG. 4) of the final ring gear 7 when the vehicle is traveling forward, and is guided to the suction side of the oil pump 9 and the portions in an especially severe lubricating condition.

Due to the oil delivering operation by means of the rotation of the final ring gear 7, the oil levels in the two sections 21, 22 in the casing 10 become different, when the transaxle 1 is operating.

In particular, when the final ring gear 7 rotates at a high speed, the oil delivering operation by means of the final ring gear 7 becomes faster. Therefore, oil is likely to accumulate in the first section 21 positioned on the downstream side of the rotation direction of the final ring gear 7 (i.e., the downstream side of the oil flow generated by the rotation of the final ring gear 7), and air is likely to accumulate in the second section 22 positioned on the upstream side of the rotation direction of the final ring gear 7 (i.e., the upstream side of the oil flow generated by the rotation of the final ring gear 7).

Therefore, to begin with, an air release portion 25 is formed in the ceiling wall of the transaxle case 11 of the casing 10 at a position corresponding to the first section 21 on the downstream side of oil flow generated by the rotation of the final ring gear 7.

In this embodiment, the air release portion 25 is a through-hole that is formed in the ceiling wall of the transaxle case 11, and to which a generally known breather plug or filter is attached. Alternatively, a generally known breather chamber having a maze-like structure may be simply provided next to the through-hole in the first section 21.

In addition, a breather pipe 30 is provided in the second section 22, as an air release passage to communicate with the outside of the casing 10. As shown in FIG. 4, the breather pipe 30 is located upstream of the air release portion 25 with respect to the oil flow direction.

As shown in FIGS. 5 and 6, the breather pipe 30 is provided to extend in a generally vertical direction, i.e., is positioned along with the vertical direction of the casing 10. The breather pipe 20 is mildly-curved twice in the middle of the longitudinal direction thereof so as to form an S-shape. Because the breather pipe 30 is thus curved, gas and oil can be separated easily, even when oil-mist enters the inside of the breather pipe 30.

An end (lower end) of the breather pipe 30 is located in the second section 22, and is positioned as high as to be kept away from the surface of the oil by a predetermined dimension when the transaxle 1 is not operating.

Further, the other end (upper end) of the breather pipe 30 is located such that the breather pipe 30 penetrates the ceiling wall of the transaxle case 11 of the casing 10 and protrudes toward the outside. Although the outer open end of the breather pipe 30 is not shown in detail, the outer open end may stay open, or an appropriate filter, a well-known breather plug or the like may be attached thereto.

Further, oil release holes 31 are provided near the lower end of the breather pipe 30 to return the oil entering the inside of the breather pipe 30 to the second section 22.

Next, the condition of the inside of the casing 10 when the transaxle 1 is operating will be described.

To begin with, when the transaxle 1 is operating, oil is splashed up by the rotation of the final ring gear 7 and is delivered or conveyed to the downstream side of the rotation direction thereof. Accordingly, oil is likely to accumulate in the first section 21 positioned on the downstream side of the rotation direction of the final ring gear 7, and air is likely to accumulate in the second section 22 positioned on the upstream side of the rotation direction of the final ring gear 7.

In this situation, when the final ring gear 7 rotates at a high speed, the oil delivering operation by means of the final ring gear 7 becomes faster. Therefore, the oil is raised and forms bubbles in the first section 21 where the oil is likely to accumulate. On the other hand, the inner pressure of the second section 22 where air is likely to accumulate increases.

However, according to the construction of this embodiment, when the above-described situation occurs, air existing on the upper side of the first section 21 is released from the air release portion 25, along with the rise of the oil or bubbles thereof.

On the other hand, although the inner pressure of the second section 22 increases, the inner pressure is rapidly and securely released to the outside of the casing 10 from the breather pipe 30.

In addition, because air is likely to accumulate and oil is reduced or removed in the second section 22, the phenomenon in which oil forms bubbles does not occur. Therefore, the lower end of the breather pipe is not closed or blocked by the oil bubbles.

As described above, the inner pressure of the casing 10 is prevented from being increased excessively and is regulated appropriately through the air release portion 25 and the breather pipe 30. Accordingly, it is prevented that the increase in the inner pressure causes leakage of the oil in the casing 10 to the outside through the breather hole or the breather plug.

Thus, according to the above-described embodiment of the present invention, the operation of the transaxle 1 is stabilized and the durability of the transaxle 1 improves.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

For example, although in the above embodiment, the transaxle 1 mounted on a front engine front wheel drive (FF) vehicle is used as an example of the vehicle transmission, a transmission mounted on a front engine rear wheel drive (FR) vehicle may be used.

Further, although in the above embodiment, a belt-type continuously variable transmission is used to form the shifting mechanism of the transaxle 1, a stepped gear mechanism, a planetary gear mechanism, or a toroidal-type transmission mechanism may be used. Alternatively, a manual transmission may be used.

The breather pipe 30 as an air release passage explained in the above embodiment may be modified appropriately, as long as it has the similar functions. Further, the breather pipe 30 may be replaced by another construction, as appropriate. For example, an air release passage may be formed in the inner wall of the casing 10 by casting.

The invention claimed is:

1. A vehicle transmission comprising:
   a casing;
   a gear, transversely mounted in the casing, that splashes up oil in the casing by rotation thereof and supplies the oil to a portion in the casing;
   an air release passage, provided in the casing on an upstream side of oil flow generated by the rotation of the gear, that communicates with outside of the casing,
   wherein the casing is divided into a first section and a second section that are respectively located on a downstream side and the upstream side of the oil flow, and that mutually communicate; and
   an air release portion provided in a top side of the casing at a position corresponding to the first section, that communicates with the outside separately from the air release passage.

2. A vehicle transmission comprising:
   a casing;
   a gear, transversely mounted in the casing, that splashes up oil in the casing by rotation thereof and supplies the oil to a portion in the casing; and
   an air release passage, provided in the casing on an upstream side of oil flow generated by the rotation of the gear, that communicates with outside of the casing,
   wherein the air release passage comprises a breather pipe, an end of which is located in the casing on the upstream side of the oil flow, and the other end of which is located outside of the casing,
   wherein the breather pipe is curved twice in the middle of the longitudinal direction thereof so as to form an S-shape located in the casing, and
   wherein oil release holes are provided at the end of the breather pipe located in the casing.

3. A vehicle transmission configured to splash up oil in a casing by rotation of a gear that is transversely mounted in the casing and to supply the oil to a portion in the casing, wherein the casing includes:
   a transaxle case having a center partition wall at a center thereof;
   a transaxle housing attached to one side of the transaxle case;
   a rear cover attached to the other side of the transaxle case;
   an oil pan attached to a bottom side of the transaxle case;
   a first section, in which the gear is disposed, the first section being provided between the center partition wall of the transaxle case and the transaxle housing, which face each other;
   a second section that is provided between the center partition wall of the transaxle case and the rear cover, which face each other, in a state where the first section and the second section are separated to be arranged side by side, the second section being provided on an upstream side of oil flow caused by the gear;
   a communication passage formed in the center partition wall so as to allow the first section and the second section to communicate with each other; and
   an air release passage that allows the second section to communicate with outside of the casing and an air release portion that allows the first section to communicate with the outside of the casing separately from the air release passage.

* * * * *